Feb. 20, 1945. F. M. SMITH 2,370,083
METHOD OF ASSEMBLING AIRPLANE FUSELAGES AND THE LIKE
Filed April 13, 1942 4 Sheets-Sheet 1
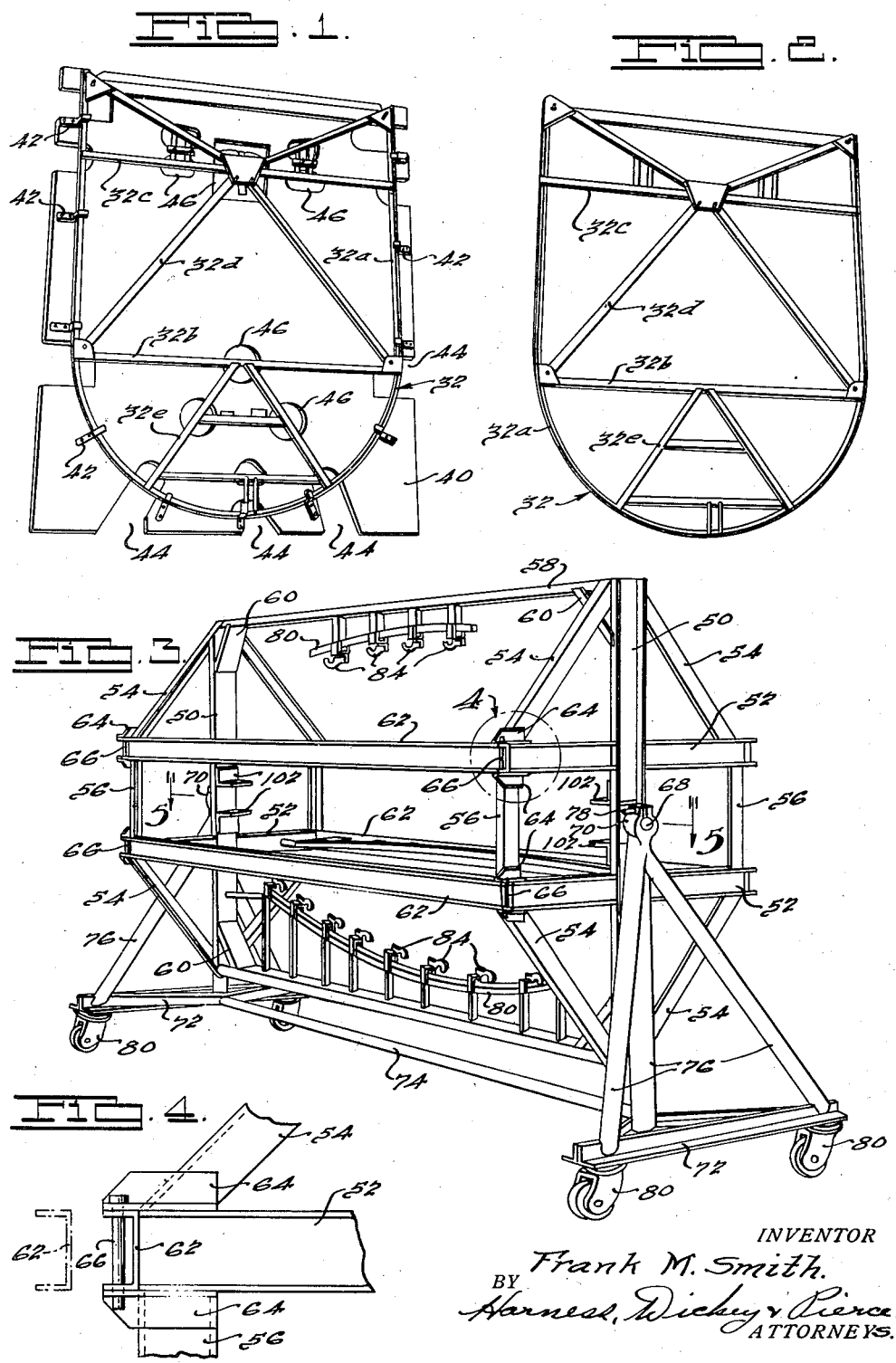
INVENTOR
Frank M. Smith.
BY Harness, Dickey & Pierce
ATTORNEYS.

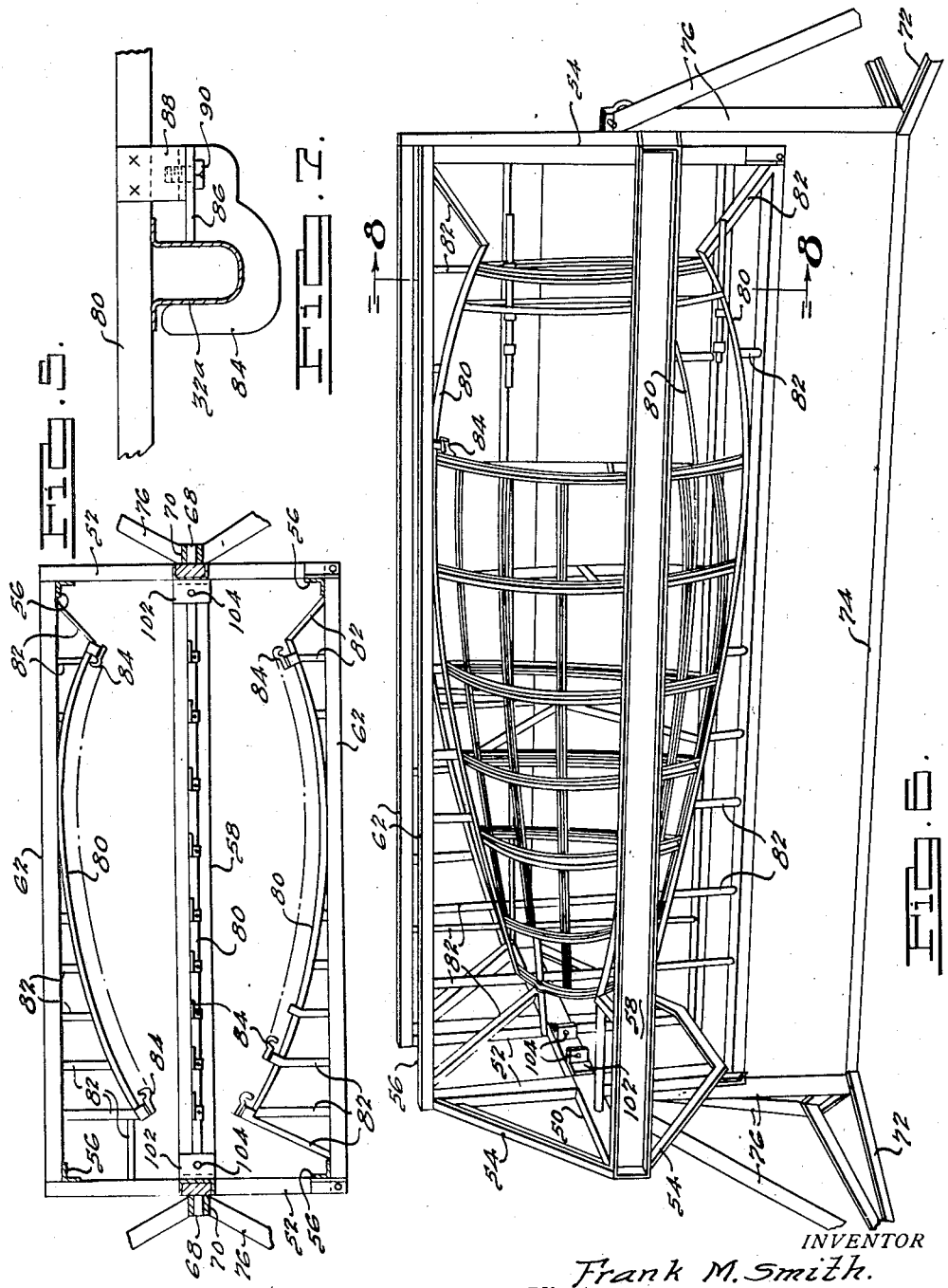

Feb. 20, 1945. F. M. SMITH 2,370,083
METHOD OF ASSEMBLING AIRPLANE FUSELAGES AND THE LIKE
Filed April 13, 1942 4 Sheets-Sheet 3
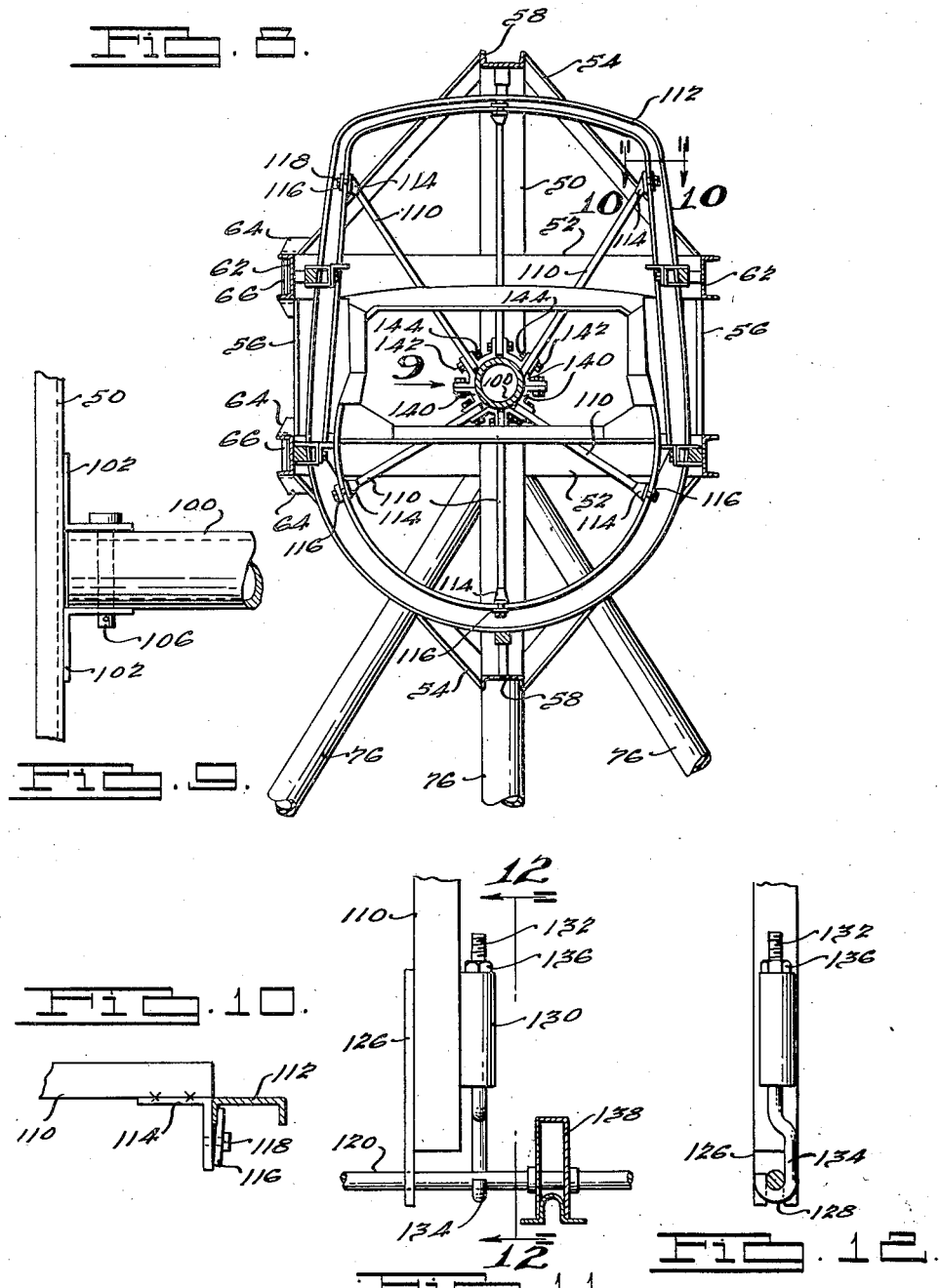
INVENTOR
Frank M. Smith.
BY
Harness, Dickey & Pierce.
ATTORNEYS.

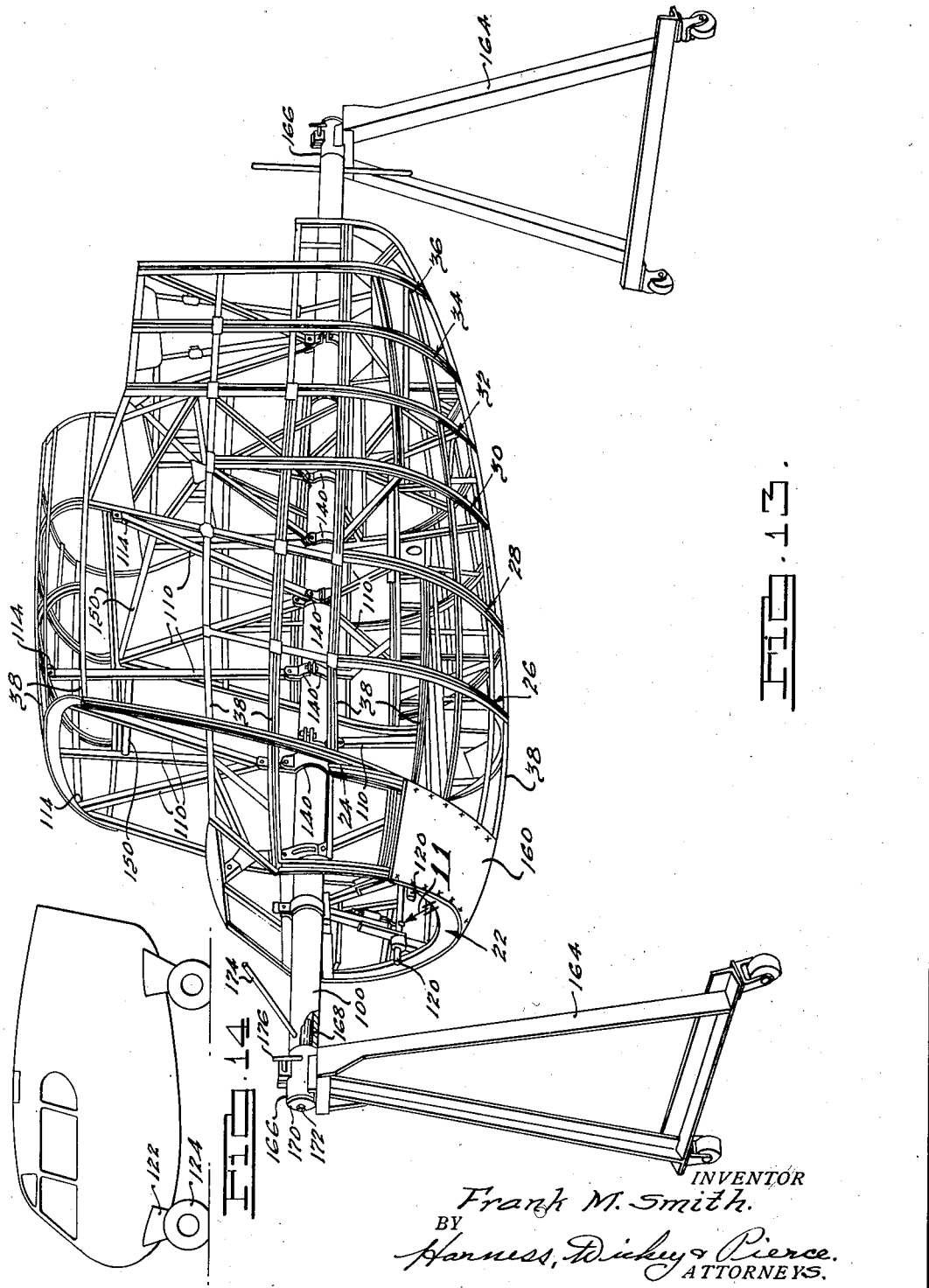

Patented Feb. 20, 1945

2,370,083

UNITED STATES PATENT OFFICE 2,370,083

METHOD OF ASSEMBLING AIRPLANE FUSELAGES AND THE LIKE

Frank M. Smith, Dearborn, Mich., assignor, by mesne assignments, to Consolidated Aircraft Corporation, San Diego, Calif.

Application April 13, 1942, Serial No. 438,692

2 Claims. (Cl. 29—148.2)

This invention relates to a method of assembling covered frame structures, together with apparatus for use therewith, and while in its broader aspects it is applicable for use in connection with a variety of different types of covered frame structures it is particularly adaptable for use in the manufacture of airplane fuselages and, accordingly, for the purpose of simplicity in description in the following specification and claims reference only to airplane fuselages will be made, the application of the invention to other devices thus being made apparent to those skilled in the art.

The principal object of the present invention is the provision of an improved method of assembling airplane fuselages, together with a suitably constructed apparatus for use therewith, by the use of which airplane fuselages may be constructed in a quick, easy and accurate manner.

Objects of the invention include the provision of a method of constructing an airplane fuselage including first fixing certain of the fuselage frame elements to one supporting device, applying the remainder of the frame elements to the first mentioned frame elements and fixing them thereto, establishing a second supporting device with respect to said frame elements and fixing it thereto while still supported by the first supporting device, then removing the first supporting device and applying the covering to the framework, and then removing the second supporting device; the provision of a method of constructing airplane fuselages including building up a complete framework therefor within an encircling locating means for certain elements thereof, then fixing the position of said frame elements with respect to an internal supporting device, removing the framework and the internally supporting device from the external supporting device, applying the covering to the framework, and then removing the internal supporting device; the provision of a method of constructing airplane fuselages having a framework and a covering comprising first forming the transverse frame elements for the fuselage and externally supporting them in the desired relation with respect to each other, fixing the transverse frames together while so externally supported by longitudinally extending frame members, providing an internal support for the framework thus constructed, removing the internal support and the framework thereon from the external support, and then applying the covering to the framework; and the provision of a method of forming airplane fuselages comprising the steps of separately forming the transverse frame members, arranging such transverse frame within an enclosing jig structure and locking them therein in their desired relation with respect to each other, applying the longitudinally extending frame elements to the transverse frame structure and fixing them thereto, then mounting an internal jig structure within the framework and locking the framework to such internal jig structure, then removing the internal jig with the assembled framework locked thereto from the external jig, then applying the exterior covering to the framework, and then removing the internal jig.

Further objects of the invention include the provision of a novel form of an assembly jig for airplane fuselages; the provision of apparatus of the type described including a pair of cooperable means each independently capable of supporting various frame elements of an airplane fuselage in predetermined relation with respect to each other; the provision of apparatus of the type described in which one of the supporting elements may be removably housed internally of the other thereof and may be removed from such other with the framework fixed thereto; and the provision of apparatus of the type described in which the supporting elements are supported for rotation.

The above being among the objects of the present invention the same consists in certain novel steps or combinations of steps of operation, and combinations of parts, to be hereinafter described with reference to the accompanying drawings, and then claimed, having the above and other objects in view.

In the accompanying drawings which illustrate the various steps of operation followed out in accordance with the method of the present invention in the manufacture of an airplane fuselage, together with apparatus for carrying out such steps of operation, and in which like numerals refer to like parts throughout the several different views, Fig. 1 is a perspective view of a jig for assembling one of the transverse frame structures with such frame structure shown mounted thereon;

Fig. 2 is a perspective view of the frame structure assembled on the jig illustrated in Fig. 1;

Fig. 3 is a perspective view of the jig structure employed for supporting the various transverse frame structures in predetermined relation with respect to each other while the longitudinally extending frame elements are fixed thereto;

Fig. 4 is an enlarged, fragmentary end elevational view illustrating one of the connections, namely that shown in the circle 4 in Fig. 3, serving to removably secure one of the side members with respect to the ends of the jig shown in Fig. 3;

Fig. 5 is a horizontal, sectional view taken on the line 5—5 of Fig. 3;

Fig. 6 is a perspective view of the jig shown in Figs. 3 and 5 with a fuselage framework mounted therein in substantially completed condition;

Fig. 7 is an enlarged, fragmentary view illustrating a typical clamp of the type employed in the jig shown in Figs. 3 to 6, inclusive, for locating and securing the transverse frame members;

Fig. 8 is a transverse sectional view taken, for instance, on the line 8—8 of Fig. 6 but illustrating the internal supporting jig applied in position in the framework;

Fig. 9 is an enlarged, fragmentary side elevational view taken in the direction of the arrow 9 in Fig. 8 to illustrate the connection between the internal supporting jig and the external supporting jig;

Fig. 10 is an enlarged, fragmentary sectional view taken on the line 10—10 of Fig. 8 illustrating a form of connection employed between the transverse frame structure and the internal supporting jig;

Fig. 11 is an enlarged fragmentary, partially sectioned view taken looking in the direction of the arrow 11 of Fig. 13 to illustrate the connection between the internal supporting jig and one of the framework parts;

Fig. 12 is a partially broken, partially sectioned view taken on the line 12—12 of Fig. 11;

Fig. 13 is a perspective view illustrating the fuselage framework supported solely by the internal jig and a portion of the covering applied thereto; and, Fig. 14 is a reduced side elevational view of the completed fuselage.

As is commonly understood airplane fuselages are made up of a framework and an enclosing skin or covering. In accordance with modern practice most of the framework and the skin or covering is constructed of metal and, for the purpose of obtaining a minimum amount of weight for the strength required, the skin or covering is relied upon to a great extent to cooperate with the framework to provide the necessary rigidity to the structure. In building up such fuselage the framework is, of course, constructed first as a complete assemblage and the skin or covering is thereafter applied to it.

It will be appreciated by those skilled in the art that in building up the framework it is possible to construct a jig to locate the various elements of the frame so that the various component parts thereof may be fixed together in accurate relation with respect to each other. However, in doing this it is necessary that the various frame parts be located interiorly of the jig while the various parts are being located and secured to each other, and that it is necessary to remove the framework from the jig in order to apply the skin or covering. Moreover, certain of the frame members may have to be sprung slightly one way or another in the jig during the assembly of the frame and after removing the frame from the jig these parts are usually free to spring back to their normal position. This effect is, of course, undesirable because of the unevenness which may thus be apparent on the surface of the completed fuselage after the skin or covering has been applied. Moreover, such frame assemblies as they are removed from the jig are more or less flexible, particularly in a torsional direction, and before the skin or covering can be applied its various parts must be accurately lined up and located in the relationship desired in the final product. This last feature necessitates the expenditure of a considerable amount of time and labor which is desirably avoided if possible.

The present invention contemplates the provision of a method of making such fuselages which will avoid the shortcomings of conventional methods as above described. This is accomplished in the following manner. In accordance with the present invention the framework is built up within a suitable assembly jig and the various component parts thereof fastened together. When the framework is thus completely, or substantially completely assembled within the jig, a second jig is inserted within the framework and is securely clamped or otherwise temporarily fixed to various members of the framework in such a manner as to be capable in and of itself to maintain the framework in the exact condition in which it has been assembled in the outer jig. The framework with the second jig within it is then removed from the outer jig, preferably supported for rotation about its longitudinal axis and, the exterior surface of the frame now being wholly exposed, the skin or covering is applied to it and securely fixed in position. By this means the desired shape and contour of the frame as determined in the first or frame assembly jig is accurately maintained until after the skin or covering is applied. It is, therefore, impossible for any inaccuracies to creep into the framework between the time it is completed and the time the covering is applied to it, the method thus offering material advantages over conventional practices.

The method of the present invention is, of course, applicable to airplane fuselages or similar structures of widely varying shapes, sizes and types. However, for the purpose of simplicity in description, in the accompanying drawings the application of the present invention to an airplane fuselage of the type in which the control surfaces at the rear of the plane are supported by booms is illustrated as this type of fuselage is proportionally smaller than those wherein the tail surfaces are carried by the fuselage and considerably simplifies the showings of the jigs, fuselage members, etc. In other words, for the purpose of description in the present application, the completed fuselage will be assumed to be of the general shape disclosed in Fig. 14.

The framework for the fuselage shown in Fig. 14 is of the type generally disclosed in Fig. 13. In other words, it includes a plurality of transverse frame structures indicated generally at 22 to 36, inclusive. These transverse frame structures are fixed with respect to each other by a plurality of longitudinally extending frame members 38.

The transverse frame structures may be built up in any suitable or conventional manner. One method of building up one of such transverse frame structures is illustrated in Fig. 1 which illustrates the jig for building up the transverse frame structure 32 by way of illustration. Referring to this figure it will be noted that the jig comprises a flat plate 40 of a size slightly greater than the frame structure to be built up thereon. Secured to one face thereof is a plurality of stops or brackets 22 which are adapted to engage the outer element 32a of the transverse frame member 32 and in conjunction with suitable clamps or the like to hold it in a predetermined position while the frame member is being built up. The stops or brackets 42 are shaped to provide an outer stop face against which the element 32a may be clamped, and an overlying face to maintain it in engagement with the face of the plate 40. Thus the frame element 32a is rigidly held on the plate 40 in its desired shape and size and then the remaining elements for the frame, such as 32b, 32c, 32d, 32e, etc., may be located in the desired relation with respect thereto and fixed thereto and to each other in any suitable manner such as welding, riveting, or the like. Suitable stop brackets (not shown) may be applied to the plate 40 for locating these various frame elements if desired. It may be noted that the plate 40 is notched out as at 44 over the area of each joint between the various frame elements and the side element 32a so as to permit access to the joints from both sides of the plate 40 for the purpose of joining them together, and holes 46 are provided in the plate 40 at the joint between the various frame elements inwardly of the outside elements 32a for the same reasons.

After the transverse frame element 32 has been built up on the plate 40 as above described it is then removed therefrom under which condition it assumes the form illustrated in Fig. 2. Certain of the locating stops or brackets may have to be temporarily removed to permit removal of the transverse frame member from the plate 40 as will be appreciated, but this offers no difficulty.

The remaining transverse frame members 22 to 36, inclusive, are built up in a manner similar to that described in connection with the transverse frame member 32, it being appreciated, of course, that where each of these transverse frame members are of different shape and/or size as in the particular embodiment shown by way of illustration, a separate plate member and differently arranged stops or brackets will be required in each case.

After all of the transverse frame members have been built up in the manner described they are then positioned and clamped in the jig illustrated in Fig. 3. This jig is of a type which encloses the various frame members therein and locates them in predetermined relation with respect to each other while the longitudinally extending frame members are fixed thereto. As indicated in Fig. 3 it comprises two rigid end assemblies each of which includes a rigid diametrically extending member 50, shown as being of channel section, a pair of spaced and parallel cross-members 52 rigidly fixed thereto and also shown as being of channel section, angle sectioned members 54 extending between each end of the member 50 and the outer ends of the next adjacent cross-member 52 and rigidly fixed to both thereof, and angular sectioned members 56 extending between the corresponding ends of the cross-members 52 and rigidly fixed thereto. The corresponding ends of the members 50 of each end of the jig shown in Fig. 3 are rigidly connected together by longitudinally extending members 58, shown as of channel section, and rigidly fixed thereto as by welding or the like. Braces 60 are preferably provided adjacent the ends of these members to render the connection more rigid. Corresponding outer ends of corresponding cross-members 52 in the two ends of the jig are connected together by a longitudinally extending rigid members 62, shown as of channel section. On one side of the jig these members 62 are rigidly fixed to the corresponding ends of the cross-members 52 as by welding, riveting or the like but those on the opposite side of the jig, shown as the near side of the jig in Fig. 3, are removably secured in place. This is accomplished in the manner illustrated in Fig. 4.

As illustrated in Fig. 4 the corresponding outer ends of the cross-members 52 have angle members 64 rigidly fixed to both the upper and lower faces or flanges thereof and the members 64 project laterally outwardly beyond the ends of the cross-members 52 so as to cooperate with the end of the corresponding cross-member 52 to provide a socket within which the corresponding end of the corresponding longitudinally extending member 62 is closely but removably received. A pin 66 is projected downwardly through each pair of members 64 and through the upper and lower flanges of the corresponding member 62 for removably locking these parts together.

The portion of the jig thus described is preferably mounted for rotation about its longitudinal central axis to facilitate working upon the fuselage assembly which is to be built up therein, and in the particular case shown this is accomplished by providing an outwardly projecting pin or trunnion 68 centrally of each member 50. Each trunnion 68 is rotatably supported in a split bearing 70 forming part of a dolly comprising end assemblies 72 rigidly connected together by means of a reach rod 74 and each end assembly of which is provided with three upwardly extending posts or struts 76 which terminate at and are rigidly fixed to the corresponding bearing 70. The bearings 70 are each provided with a clamping bolt or element 78 engaging across the line of split thereof and by means of which each trunnion 68 may be releasably clamped in its corresponding bearing 70 to lock the jig in rotatably adjusted position about the axes of the trunnions 68. Castors 80 are preferably provided under each end assembly 72 of the dolly so as to permit the jig assembly to be shifted as a whole for the purpose of facilitating work upon frames being assembled therein, or for other purposes.

Each of the longitudinally extending members 58 and 62 of the jig thus far described has fixed to its inner face a longitudinally extending relative rigid member 80, best brought out in Figs. 3, 5 and 6. The members 80 are longitudinally curved into exact conformation with the desired exterior curvature of the fuselage framework along an intended line of contact therewith. Each member 80 is rigidly secured to its cooperating member 58 or 62 by means of a plurality of rigid struts or braces 82 extending between it and its corresponding member 58 or 62 and rigidly fixed thereto as by welding, riveting, or the like. Thus each member 80 is rendered rigid and unyielding.

A plurality of clamping members 84 are mounted on each of the members 80. While these clamping members may be of any suitable design and construction, the type shown is simple and efficient and, as illustrated in detail in Fig. 7, each comprises a U-shaped portion having oppositely directed flanges 86 at one side thereof. The members 80 are provided with a bracket 88 in associated relation with respect to each clamping member 84 and which brackets 88 are rigidly fixed to the corresponding members 80 by welding or the like. The inner faces of the brackets 88 are flat and parallel to the corresponding member 80 and are adapted to receive the flanges 86 of the corresponding member 84. Machine screws 90 are adapted to pass through the flanges 86 and thread into the corresponding bracket 88 to removably fix each member 84 with respect to its bracket 88 and, accordingly, with respect to the corresponding member 80. Each clamping member 84 is adapted to embrace the outer element of a transverse frame member within the U thereof as illustrated in Fig. 7. In the particular case shown this outer element may be considered to be the outer element 32a of the frame member 32 and in the particular case shown it is considered to be of generally channel section with outwardly directed flanges at the open side of the channel which is located at the outer side of the element.

As indicated in Fig. 7 the relation of the clamp 84 and the bracket 88 is such that when the clamp 84 is tightened down by the screws 90 on the bracket 88 the outer flanges of the frame element 32a will be pressed against the corresponding member 80.

It will be appreciated that the clamps 34 and brackets 88 are located along each member 80 in accordance with the positions of the various transverse frame members 22—36 desired in the final product, and that each member 80 is provided with a clamping member 84 for each of such transverse frame members as is intended to come in contact therewith. It will also be appreciated that not only do the clamping members serve to pull any such frame element out into contact with the corresponding member 80 where its form is not sufficiently accurate to contact such member 80 of its own accord, but the clamping members are so positioned longitudinally of the members 80 as to accurately locate the transverse frame members with respect to each other longitudinally of the fuselage framework.

With the above explanation in mind it will be appreciated that after the various transverse frame members 22—36 have been fabricated in the manner illustrated in Fig. 1 or otherwise, they are then introduced into their proper position in the jig illustrated in Fig. 3 and are clamped securely in position against the various forming members 80 by means of the clamping members 84. The removable jig frame members 62 may be removed for the introduction of these frame members into the jig and then replaced when they are so introduced, and the frame members then clamped to the members 80 carried thereby.

All of the frame members having thus been introduced into the jig illustrated in Fig. 3 and having been securely clamped in position and thereby located with respect to each other and brought into the proper contour as determined by various members 80, they are then in a position to receive the longitudinally extending frame members 38. These may be of any suitable character or design but in any case they are introduced within the assemblage of the transverse frame members thus provided and are secured thereto in the desired location by welding, riveting, or the like in which case they may assume the relation illustrated in Fig. 6. At the same time any additional braces, gussets, or the like between the transverse frame members and the longitudinally extending frame members may be secured in place so as to complete or substantially complete the entire framework. When this operation has been completed it will be appreciated that a complete, or substantially complete framework is now provided, but inasmuch as it is externally surrounded by the jig structure illustrated in Fig. 3 it is impossible to apply more than a portion of the skin or covering with which it eventually must be provided with. It is, therefore, necessary to remove this framework from the externally supporting jig, or to remove the jig from it, in order to apply such skin or covering thereto.

As previously explained if this framework is simply removed from the jig above described, because of the fact that the framework in such condition may twist or spring in one direction or another, it would be necessary to suitably support it and line it up throughout before attempting to apply the outer skin or covering as the latter cooperates therewith to provide a rigid and unyielding structure and unless it was so lined up the resulting structure would be permanently out of the true character desired in the finished airplane.

The above described difficulty is obviated in accordance with the practices of the present invention by introducing an internal jig within the thus completed framework and rigidly fixing it with respect to the framework before such framework is removed from the external jig. By this means distortion of the framework upon removal from the external jig is definitely eliminated and at the same time means are provided for supporting the framework for application of the external skin or covering thereto.

This internal jig in the particular form thereof illustrated in Figs. 8 to 13, inclusive, includes and is built up on a rigid central member through which it receives its strength and rigidity. In the particular internal jig structure shown this internal member comprises a tube 100 of relatively large diameter and of relatively thick wall section and for that reason is extremely strong and rigid in character. When it is applied to the external jig illustrated in Fig. 3 it is located on the longitudinal axis thereof, that is coaxially with the trunnions 68, and it is of a length substantially equal to the distance between the opposite end members 50 of such external jig.

In order to removably support the tube 100 between such end members 50 each such end member, as clearly brought out in Fig. 3, has secured to its inner face a pair of angle brackets 102 one flange of each of which is fastened in flat contacting relationship with respect to the inner face of the corresponding member 50 and the opposite flange of which projects towards the opposite end of the external jig. The projecting flanges of each pair of brackets 102 are spaced from one another by a distance equivalent to or slightly greater than the diameter of the tube 100 and equally on either side of the axial line of the trunnions 68 so that the ends of the tube 100 may be closely but removably received between each pair of brackets 102.

As best brought out in Figs. 5 and 6 the projecting flange of each bracket 102 is provided with a central opening 104 therein and each end of the tube 100 is provided with a diametrical opening therethrough arranged to be aligned with the openings 104 so that, as brought out in Fig. 9, a pin 106 may be projected through the holes 104 of each cooperating pair of brackets 102 and through the hole in the corresponding end of the tube 100 thereby to lock the tube 100 in position on the central axis of the external jig. By this means a suitable support for the internal jig within the external jig is provided.

The remainder of the internal jig principally comprises a plurality of rods or struts 110 which extend outwardly from the tube 100 in a generally radial direction therefrom and are rigidly secured to the various transverse frame structures and particularly to the outer elements thereof. A sufficient number of such rods or struts 110 are fixed to the tube 100 substantially in, or adjacent to, the plane of each transverse frame member so as to enable them to rigidly maintain the position and shape of such transverse frame member as determined by the external jig, when the external jig is removed.

The outer ends of the struts or rods 110 may be clamped or otherwise secured to the outer elements of the corresponding transverse frame members in any suitable manner and which, of course, may vary in accordance with the cross-sectional configuration of such outer element. The particular outer element of the transverse frame structure illustrated in Fig. 8 is assumed to be of channel section with the open side of the channel opening longitudinally of the fuselage as indicated in Figs. 8 and 10 at 112. In order to clamp the rods or struts 110 to such element 112 each corresponding rod or strut 110, as illustrated in Fig. 10, is provided with an angle bracket 114 secured thereto, one leg of the bracket being fixed in flat contacting relationship with respect to the outer end of the strut 110 and the remaining leg thereof projecting laterally outwardly therefrom. Such outwardly projecting leg is arranged to abut against the inner flange of the element 112 and a clamping plate or clip 116 arranged in overlying relationship with respect to the outer face of the bracket 114 and the inner flange of the element 112 is drawn into clamping relationship with respect to the bracket 114 by means of a screw 118, thus serving to rigidly and removably clamp the rod or strut 110 to the element 112.

A different form of connection between certain of the rods or struts 110 and the fuselage framework is illustrated in Figs. 11 and 12. The particular type there shown is that employed at the location indicated by the arrow 11, adjacent the nose end of the framework as illustrated in Fig. 13, and at which point the framework includes rods or tubes 120 which serve as a means for connecting the forward legs 122 for the forward landing wheels 124, shown in Fig. 14, to the fuselage. In this case the outer end of the cooperating strut or rod 110 is provided with a plate 126 fixed to one side thereof and projecting outwardly beyond the end thereof. As indicated in Fig. 12 the outer end of the plate 126 is slotted as 128 so as to receive the rod 120 therein. On the opposite side of the strut or leg 110 a sleeve 130 is fixed to the side of the rod or strut 110 and within which the shank 132 of a hook member 134 is slidably receiver. The hook end 134 engages around the rod 120 and the shank 132 projects through the sleeve 130 and receives a nut 136 thereon. From this it will be appreciated that when the nut 136 is tightened up it will draw the hook member 134 longitudinally of the associated rod or strut 110 and hold the rod 120 firmly against the bottom of the notch 128 in the plate 126, thus releasably fixing it to the end of the plate 126. The rod 120 is, of course, extended between and fixed to adjacent frame elements such as indicated at 138 in Fig. 11 so that by this means such frame element is rigidly maintained in position with respect to the tube 100.

It is, of course, impossible to introduce the internal jig into the framework assembled within the outer jig while such inner jig is in the condition shown. To introduce it into the framework the rods or struts 110 must either be removed or else must be capable of being folded down onto the tube 100 while it is being introduced into the framework. The method of connecting the rods or struts 110 to the tube 100 shown in the drawings is such as to permit either complete removal of the rods or struts 110 or folding thereof against the tube 100 as may be desirable or necessary in each particular case. In other words in the construction shown folding of certain of the rods or struts 110 on the tube 100 without complete removal thereof for assembly or disassembly purposes is possible in those cases where they will have sufficient space between the transverse frame members to permit them to be folded out into their operative position after they have been introduced into the assembled framework with the tube 100. Others, because of the inability to swing them to their operative position from a position lying in substantial contact with the outer face of the tube 100, must be removed for introduction of the internal jig and replaced after the tube 100 has been inserted in the framework.

The particular method of securing the rods or struts 110 to the tube 100 shown comprises a plurality of segmental member 140, best brought out in Fig. 8 and each of which is provided with a generally radially directed flange at each end thereof. The curvature of the inner faces of the segmental members 140 is the same as that of the exterior surface of the tube 100 and the inner ends of the rods or struts 110 are positioned between the opposed flanges on the adjacent ends of adjacent segmental members 140 and are clamped between such flanges by means of bolts such as 142 and nuts 144. The length of the segmental members 140 is such as to cooperate with one another and with the ends of the struts or rods received between adjacent ones thereof so as to completely encircle the tube 100 in line with each transverse frame member and be rigidly clamped to the tube 100 when the various bolts 142 and nuts 144 are tightened up.

To further aid in rigidifying the inner jig structure one or more rods or struts 110 of a group associated with one transverse frame member may be interconnected to corresponding rods or struts 110 of a group associated with another transverse frame member by braces such as 150 extending generally longitudinally of the fuselage as best indicated in Fig. 13. These braces 150 must, of course, be removably secured in place to permit assembly and disassembly of the internal jig structure within the framework for the fuselage.

The internal jig having thus been assembled in the framework as completed within the external jig, the internal jig with the framework thus supported on it is ready to be removed from the outer jig. This is accomplished in the construction shown by first removing all of the clamping members 84 securing the completed framework to the outer jig, and then removing the pins 66, which permits the two members 62 connected thereby to the ends of the outer jig to be removed, thus opening up the side of the outer jig to permit the removal of the framework with the inner jig therein therefrom. At this time the outer jig is preferably in the position illustrated in Fig. 3 wherein the latter mentioned members 62 are positioned at the side as shown. Under the above described conditions the inner jig with the framework supported thereon will be supported within the outer jig solely through engagement of the tube 100 with the brackets 102 and held against withdrawal therefrom solely by the pins 106. Upon removal of the pins 106 the assembly consisting of the internal jig and the framework mounted thereon is bodily movable out of encompassing relation by the outer jig and this, of course, is readily accomplished. The opposite ends of the tube may then be supported in any suitable manner and the skin or covering, a portion of which is indicated at 160 in Fig. 13 may then be applied to the exterior of the framework and secured in place by welding, riveting, or the like.

One form of means for thus suitably supporting the internal jig with the framework thereon is illustrated in Fig. 13 and comprises a pair of horses or supports of triangular formation indicated generally at 164, one of which is arranged at each end of the tube 100 in supporting relation thereto. In the particular construction shown the upper end of each horse or support 164 is provided with a split bearing 166 fixed to the upper end thereof. Rotatably received within each bearing 166 is a short shaft or trunnion 168 and which projects inwardly from the bearing 166. It is kept from moving inwardly of the bearing 166 beyond its intended position by means of a large washer 170 secured to its outer ends by means of a screw 172 and engaging the outer end of the bearing 166. The inner end of each shaft or trunnion 168 is of a size to be relatively closely but slidably received in the corresponding outer end of the tube 100 and is provided with a diametrically extending opening in such projecting end adapted to be brought into alignment with the same opening in such end of the tube 100 through which the pin 106 was received when the tube was mounted within the external jig. A bar 174 is projected through such aligned openings and not only serves to lock each trunnion 168 axially with respect to the corresponding end of the tube 100 but also serves as a handle by means of which the internal jig and the framework thereon may be rotated about the axis of the tube 100. The bearings 166 are split and are provided with a clamping element 176 by means of which they may be tightened up on the trunnions 168 so as to lock the assembly of the internal jig and the framework in any desired position of rotation about the axis of the trunnions 168. It will, of course, be appreciated by those skilled in the art, in this respect that it is of great advantage to be able to rotate the frame while the skin or covering 160 is being applied thereto as it enables the workmen to work more or less at shoulder height.

After the skin or covering 160 has been substantially completely applied to the framework, excepting, of course, those portions at the end of the framework which cannot be applied because of the presence of the tube 100, then the fuselage is substantially in its completely fabricated condition and at least is in a condition of rigidity such that it will not now spring out of shape when the internal jig is removed. Accordingly, the various struts or rods 110 may be released from engagement with the cooperating element of the framework and where necessary removed from the tube 100, and the tube may then be removed and those parts of the fuselage still remaining to be completed then completed.

From the above it will be appreciated that by the practices of the present invention the various elements of such fuselage and the framework may be accurately positioned and secured together within the outer jig structure, that thereafter the internal jig structure may be introduced within the framework and rigidly secured thereto in proper position so as to rigidly maintain the framework in the position determined therefor by the outer jig structure when it is removed with the internal jig from the outer jig structure. Also that when the framework is thus removed from the outer jig structure with the inner jig structure in place therein, the skin or covering may be applied to the framework to aid in thus tying the framework and the skin or covering into a rigid and substantially non-yielding unit which will accurately retain its shape and contour after the internal jig structure has been removed therefrom.

It will also be appreciated that the particular form of apparatus illustrated as suitable for carrying out the method described includes in and of itself certain features of novelty enhancing the ease and accuracy with which the above described method may be carried out.

Having thus described my invention what I claim by Letters Patent is:

1. In the manufacture of an airplane fuselage or the like including a framework and an enclosing skin or covering fixed to the exterior thereof, the steps of building up said framework within an external jig, securing an internal jig to said framework while the latter is still mounted within said external jig, removing said internal jig with said framework mounted thereon from said external jig, then applying said covering to said framework while said framework is maintained in position by said internal jig, and thereafter removing said internal jig from said covered framework.

2. In the manufacture of an airplane fuselage including a framework comprising transverse frame members and longitudinally extending frame elements fixed thereto and a covering externally applied thereto, the steps of inserting said transverse frame members in an external jig in predetermined relation longitudinally of said framework with respect to each other and forcefully locating a plurality of points of each of said transverse frame members in a desired position, applying said longitudinally extending frame elements to said transverse frame members and fixing them rigidly thereto, mounting an internal jig within said framework and said external jig and clamping said framework rigidly thereto in the position determined by said external jig, removing said internal jig and said framework thereon from said external jig, applying said covering to said framework, while said framework is maintained in position by said internal jig, and thereafter removing said internal jig from said covered framework.

FRANK M. SMITH.